US009347194B2

(12) United States Patent
Knezek et al.

(10) Patent No.: US 9,347,194 B2

(45) Date of Patent: May 24, 2016

(54) LIGHWEIGHT CONCRETE COMPOSITION FOR SOIL STABILIZATION, ESPECIALLY IN SHORELINE AND WATERBOTTOM AREAS

(71) Applicant: Truston Technologies, Inc., Broussard, LA (US)

(72) Inventors: Erick Benjamin Knezek, Lafayette, LA (US); Matthew Allen Marcy, Annapolis, MD (US)

(73) Assignee: TRUSTON TECHNOLOGIES, INC., Annapolis, MD (US)

( * ) Notice: Subject to any disclaimer, the term of this patent is extended or adjusted under 35 U.S.C. 154(b) by 0 days.

(21) Appl. No.: 14/080,401

(22) Filed: Nov. 14, 2013

(65) Prior Publication Data

US 2014/0140769 A1 May 22, 2014

Related U.S. Application Data

(60) Provisional application No. 61/726,643, filed on Nov. 15, 2012.

(51) Int. Cl.
*C09K 17/50* (2006.01)
*E02B 3/12* (2006.01)
*C09K 17/40* (2006.01)

(52) U.S. Cl.
CPC ................ *E02B 3/128* (2013.01); *C09K 17/40* (2013.01); *E02B 3/121* (2013.01)

(58) Field of Classification Search
CPC ....... C04B 14/06; C04B 14/068; E02B 3/128; E02B 3/12; E02B 3/121
USPC ...................................... 405/15–18; 106/803
See application file for complete search history.

(56) References Cited

U.S. PATENT DOCUMENTS

| | | | | |
|---|---|---|---|---|
| 1,879,430 | A * | 9/1932 | Noetzli | 405/116 |
| 4,184,786 | A * | 1/1980 | Richards | 405/108 |
| 4,345,856 | A * | 8/1982 | Tuck | 405/302.6 |
| 4,521,131 | A * | 6/1985 | Nandlal | 405/116 |
| 4,655,637 | A * | 4/1987 | Vignocchi | 405/17 |
| 5,897,946 | A * | 4/1999 | Nachtman et al. | 428/323 |
| 6,558,081 | B2 * | 5/2003 | Hull | 405/157 |
| 2007/0113756 | A1 * | 5/2007 | Hull | 106/811 |
| 2012/0097074 | A1 * | 4/2012 | Kalb et al. | 106/708 |
| 2012/0117739 | A1 * | 5/2012 | Cook | 14/73 |

* cited by examiner

*Primary Examiner* — Tara M. Pinnock
(74) *Attorney, Agent, or Firm* — Law Office of Jesse D. Lambert, LLC

(57) ABSTRACT

A lightweight concrete composition is mixed from cement, sand, water, and organic material, and placed on an area of soil, proximal a body of water, to protect the soil from erosion and the like due to water action. Preferably, the organic material comes from the area in which the soil is being stabilized, and may include soil, leafy matter, and ground up wood, forming a particulate organic material. Preferably, the final density of the resulting lightweight concrete composition is greater than the density of the water in the body of water, and less than the density of the soil being stabilized. A representative density range is between 62.43 pounds per cubic foot and 100.00 pounds per cubic foot.

3 Claims, 4 Drawing Sheets

10
100
FS
120
90
110
130
200
210

LIGHWEIGHT CONCRETE COMPOSITION FOR SOIL STABILIZATION, ESPECIALLY IN SHORELINE AND WATERBOTTOM AREAS

CROSS REFERENCE TO RELATED APPLICATIONS

This regular United States Patent Application claims priority to U.S. provisional patent application Ser. No. 61/726,643, filed Nov. 15, 2012, for all purposes.

BACKGROUND

As is well known, soils, namely soil surfaces, in proximity to bodies of water, including shorelines and waterbottoms, are subject to erosion and similar destructive action due to normal wave and current action. In addition, unusual weather events, including hurricanes and the like, can result in extreme loss of land. This is well documented in coastal regions, including but not limited to the coast of the state of Louisiana.

It is desirable to have a way to protect such soils, but to do so in a manner which does not itself cause erosion or subsidence to the soil being protected. While the placement of large, heavy objects such as rock, conventional concrete, wrecked vessels, etc. has been used to buffer wave and current action with some success in certain applications, a problem with such materials is that their high density (with respect to water and to the soils on which they rest) causes them to often gradually sink into the soil. Depending upon the setting, more harm than good can result.

SUMMARY OF THE INVENTION

A lightweight concrete composition embodying the principles of the present invention comprises a relatively light weight concrete material or composition, generally somewhat denser than the water in the body of water in which it is placed or is adjacent to, but lighter than the soil on which it rests, which can be placed in strategic locations on soil surfaces in proximity to bodies of water to stabilize the soil and reduce land loss. Depending upon the application, the concrete composition may be mixed and applied to the soil to be protected, the mixing and application carried out generally at the soil stabilization area; alternatively, the composition may be mixed and formed into a desired shape, then brought to the soil stabilization area, and installed. Preferably, the composition comprises cement; typically small aggregate such as sand; and a lightweight component, preferably organic material, which aids in yielding the desired final density of the composition.

Preferably, the organic material can be secured at the soil stabilization area, e.g. ground up wood, wood chips, leaf and other particulate matter, etc. comprising an organic feedstock. On site testing can be done to verify that the resulting composition density is appropriate for the as-measured soil density and flow characteristics of the soil (e.g, whether consolidated or unconsolidated, ease by which it moves with applied force, etc.), and water density. The invention includes the resulting lightweight concrete composition and the methods of mixing same, including on-site mixing and application of the composition, in addition to remote mixing, forming into desired shapes, then placement at the soil stabilization area.

DESCRIPTION OF THE INVENTION

Figure 1:
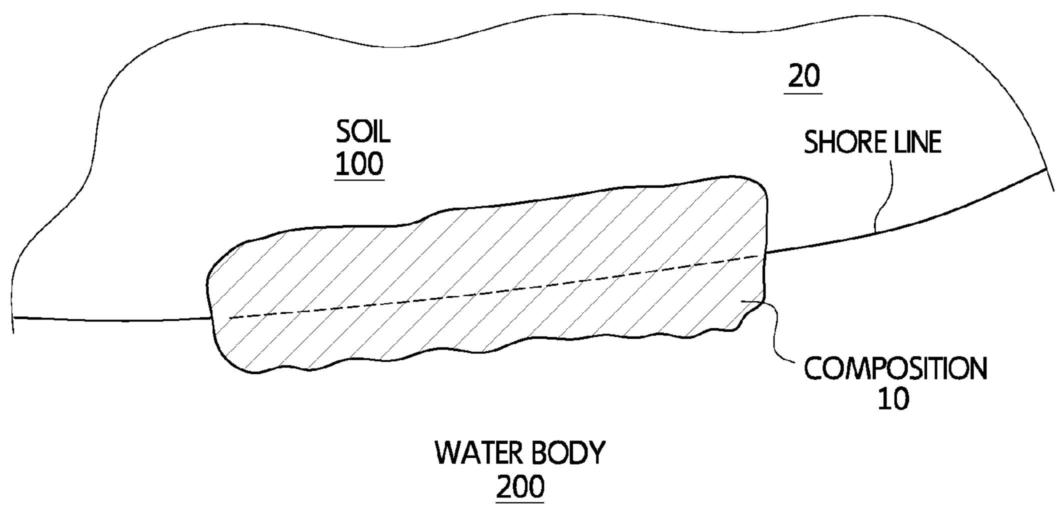
FIG. 1 is a top view of a typical shoreline application of the composition of the present invention, showing a protective application of the invention.

While various changes may be made to form different embodiment of the present invention, by way of illustration and not limitation some of the presently preferred embodiments can be described.

The present invention comprises a composition of material, methods of making the composition both at an installation site (a soil stabilization area) and remotely, and application of same.

Components of the Composition of the Present Invention

The composition is a lightweight concrete type material preferably with a preferred density generally greater than that of the water which it is in contact with or is installed in, yet less than the soil on which the composition is placed. For example, in a fresh water environment with the water having a nominal density of approximately 62.43 pounds per cubic foot, a presently preferred embodiment of the composition has a density in the range between 64 pounds per cubic foot and 80 pounds per cubic foot (pcf). This density is greater than that of fresh water, but less than that of the typical soft soils adjacent to and under bodies of water (water bottoms), for example typical swamp mud found in south Louisiana, at approximately 80 pcf. Such soils typically have a high organic material (bits of wood, leaves, etc., which may be in various degrees of decomposition) content. These environmental conditions would be commonly encountered in swamps and freshwater marshes.

It is understood that other environmental conditions may warrant a different density range. For example, an application in a coastal environment may be in saltwater having a density of approximately 67.45 pcf, and on soils having a high sand (silica) content, with a density approaching 100 pcf. These environmental conditions may be quite common in coastal bays, passes, and beachfronts. In such cases, the composition density may be higher than in a swamp or fresh water marsh type environment.

Preferably, the lightweight concrete composition comprises cement, small aggregate such as sand, water, and organic material. A number of different types and mixes of organic material are suitable, all used generally in lieu of coarse stone or rock aggregate. In one test composition, cypress mulch, made from cypress wood cut or chipped into pieces, was used in lieu of rock aggregate. The pieces of cypress varied in size, with a representative piece being approximately ½" thick, 1" wide by 2" long. The cypress mulch contained a number of pieces of both larger and smaller size. It is understood that the organic material from which an organic feedstock may be created may comprise a variety of materials, including but not limited to soil, leaves, leaf mold, naturally occurring small pieces of wood, and small pieces of wood created by chipping, grinding, etc.

Other ingredients included Portland cement, silica sand, fine aggregate, and water. Mixing of the ingredients was performed in an electric multi-mixer. Mix designs were tested by varying the amount of organic material, namely cypress mulch, silica sand and fine aggregate, and the water to cement ratio. Test samples were formed into standard 6-in×12-in test cylinders, directly underwater, to simulate in-situ placement. Composition mixes were developed with the potential for surface casting as well as underwater placement. Designs yielded lightweight concrete compositions with unit weights ranging from 72.5-97.5 pounds per cubic foot. As noted above, site specific design would be based on actual conditions.

Method of Making the Concrete Composition

As noted above, the concrete composition may be formed by mixing same in commercially available mixing apparatus, as known in the art for concrete mixing and the like. The sequence of adding components is generally of secondary importance. Final densities can be measured to provide input for adjusting proportions of components.

Figure 2:
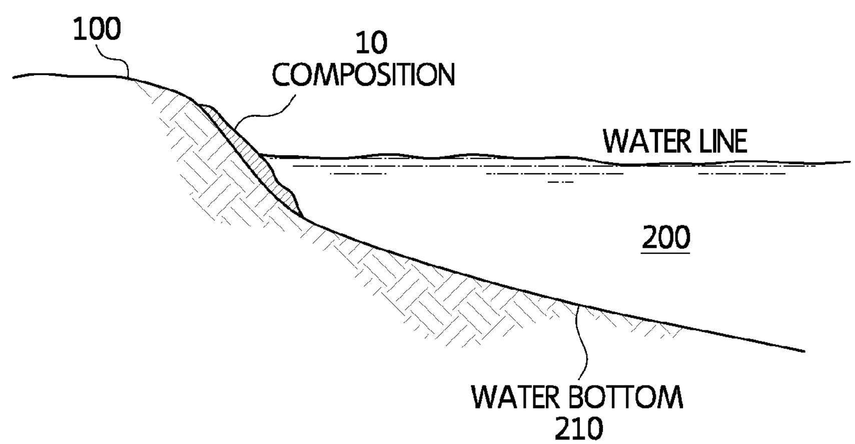
FIG. 2 is a cross-section view of the application of FIG. 1.
Figure 3:
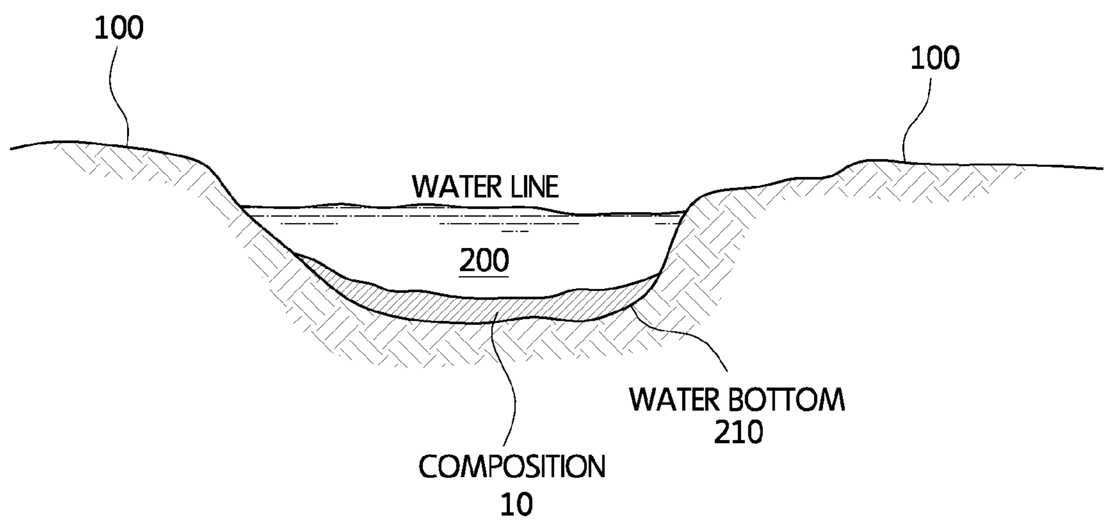
FIG. 3 is a cross-section view of a completely underwater application of the composition, generally protecting a water bottom in a channel.

Yet another novel feature of this composition, in a presently preferred embodiment, is that at least a portion of the organic materials comprising the composition are indigenous to the area or site at which it is being placed, namely a soil stabilization area. Generally, the area surrounding an area of soil to be stabilized, as can be seen in FIGS. 1-3, defines a soil stabilization area 20. As noted above, cement is used to bind the composition materials (cement, small aggregate, water, and organic material) together. In an exemplary application, the organic materials can be swamp mud comprising marsh water and fine silts (or sand and water); or soil taken from the soil stabilization area. Lightweight stone aggregate can be used in combination with lightweight organic matter, such as wood chips, to achieve the desired unit weight or density. For example, wood and other organic material gathered at or near the soil stabilization area comprise an organic feedstock, which can be transferred to a means for creating particulate organic matter, namely chipped or mulched on site, in conjunction with the mixing process, to yield a desired density to be used for soil stabilization purposes. Mixing equipment known in the art can be brought on site, either on land or water conveyances such as barges, as further described below.

The concrete composition can be used to protect soils on shorelines, water bottoms, beaches, and marsh lands by casting in place or by setting precast sections in place. The density of the composition helps prevent the composition from sinking over time in soft swamp like soils, yet provides protection to the area it is placed. It is used in place of conventional, much denser materials, such as typical stone aggregate or concrete materials.

As described above, the composition can be mixed on location and applied to the desired location. FIG. 1 shows an exemplary application along a shoreline, where a layer of the composition 10 is applied to the soil 100 so as to extend above and below the expected waterline. The soil stabilization area 20 is that area generally surrounding the area of soil being stabilized. Preferably, at least a portion of composition layer 10 underlies water 200, while a portion of composition layer 10 is outside of water 200. Different applications may alter placement of composition layer 10 with respect to water 200. It is readily understood that such application will provide substantial protection from wave action. FIG. 2 is a cross section through the water and soil column of the application shown in FIG. 1.

FIG. 3 shows an exemplary application wherein the concrete composition 10 is positioned in a layer fully below the surface of water 200, for example to protect the water bottom 210 in a channel from scouring by current action, etc.

It is understood that as an alternative to mixing and placing the composition on location, the composition could be mixed at a remote location, and formed into desired shapes, for example flat sheets, curved to conform to existing or built-up shorelines, etc., brought to a desired location either by land or water conveyances, and put into place.

If required in a particular application, the composition could be temporarily or permanently anchored in place with stakes or the like driven through holes in the composition into the soil.

Figure 4:
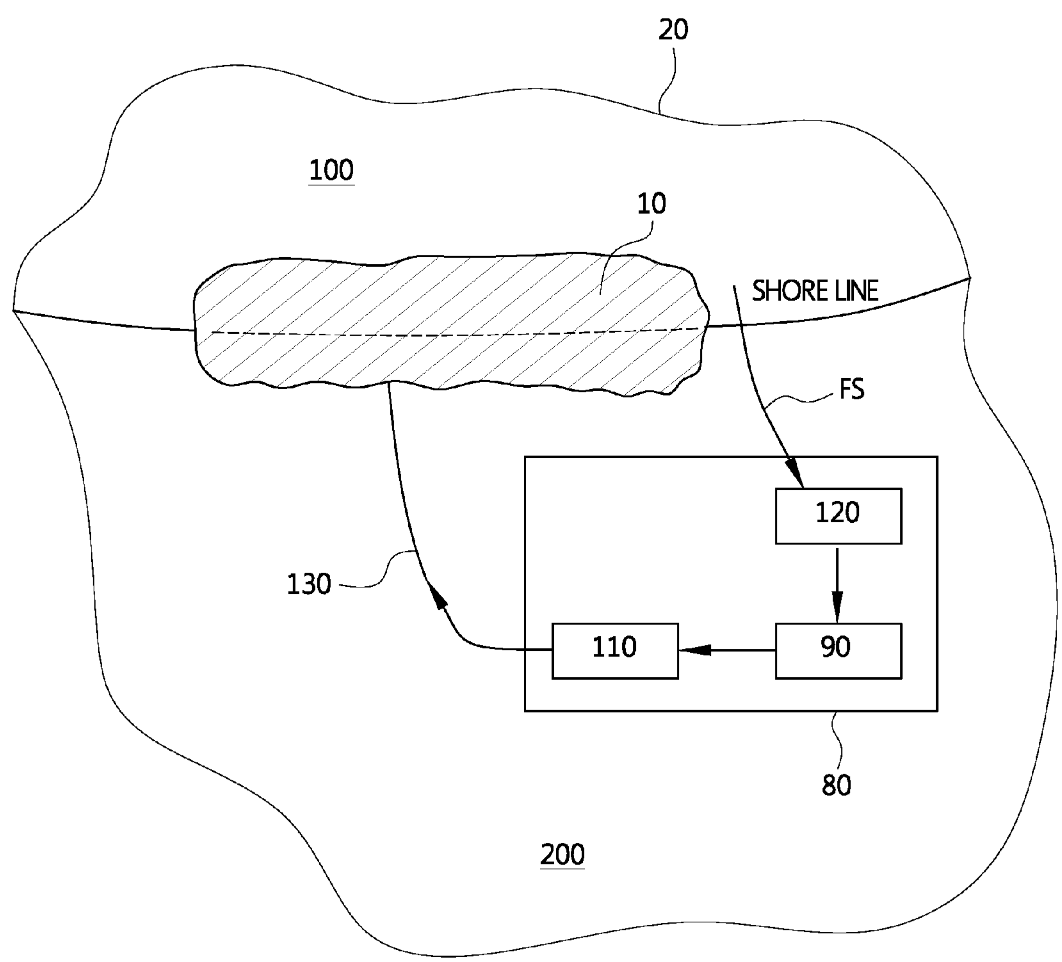
FIG. 4 is a plan (overhead) view of an exemplary in-situ application of the lightweight concrete composition, using equipment positioned on a floating barge.
Figure 5:
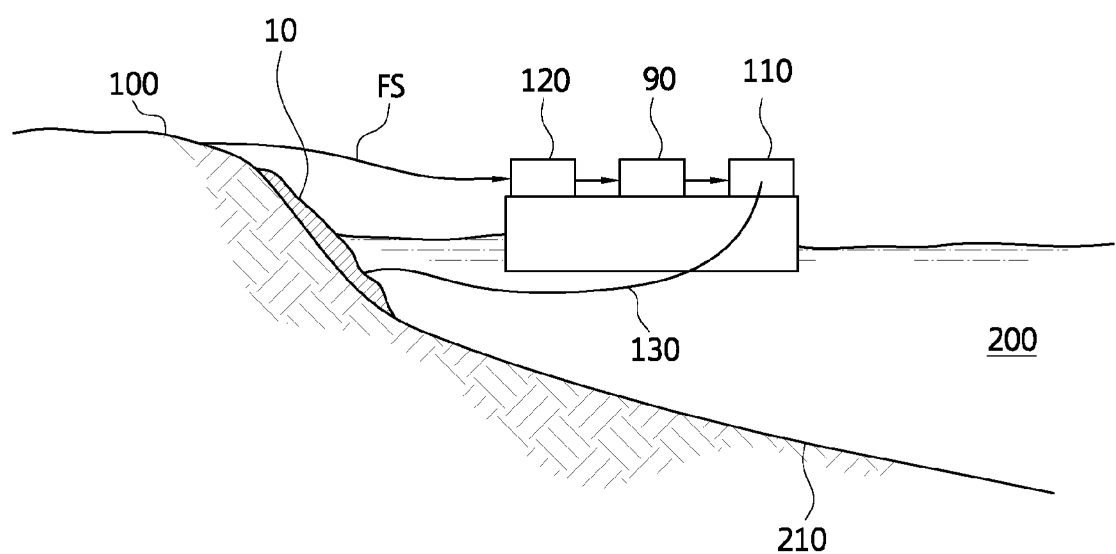
FIG. 5 is a cross section view of the arrangement of FIG. 4.

A Method of Mixing and Placing the Composition at the Soil Stabilization Site While a number of methods of mixing the lightweight composition, and placing it on soil within a soil stabilization area are possible, with reference to FIGS. 4 and 5 one presently preferred embodiment can be described.

An area of soil 10 proximal to a body of water 200, and an area proximal thereto, defines a soil stabilization area, generally referenced as 20. Soil stabilization area 20 typically comprises a number of different organic materials, such as soil, leafy matter, and large and small woody pieces, for example twigs and tree branches of different sizes. This variety of organic material comprises an organic feedstock.

A vessel, which in FIG. 4 is a barge 80, is brought to the area and positioned in the water proximal the area of soil to be stabilized. The term "barge" is used broadly herein, and encompasses floating vessels of suitable size and configuration for placement of needed equipment and materials thereon. Positioned on barge 80 are a mixer 90 and a pump 110. A means for creating particulate organic material from organic feedstock 120 is provided, either on barge 80 or on the soil. The means for creating particulate organic material 120 may comprise a commercially available leaf/limb chipper/shredder.

The organic feedstock FS is transferred to the means for creating particulate organic material 120, and a quantity of particulate organic material is created, which is transferred to mixer 90. Other components of the composition, including cement, small aggregate such as sand, and water, are also mixed to yield the lightweight concrete composition of the present invention. Density testing is carried out and material proportions are adjusted to yield a lightweight concrete composition of desired density, as described above generally greater than the density of the water in the body of water, and less than the density of the soil being stabilized.

Pump 110, with hoses 130 as appropriate, is then used to pump the lightweight concrete composition to the desired placement, forming a layer of concrete composition 10, as seen in FIG. 5. In this exemplary drawing, concrete composition 10 may be all or partly beneath the surface of water 200, or completely out of water 200.

Conclusion

While the preceding description contains many specificities, it is to be understood that same are presented only to describe some of the presently preferred embodiments of the invention, and not by way of limitation. Changes can be made to various aspects of the invention, without departing from the scope thereof. For example, densities of the lightweight concrete composition can be varied to suit particular soil and water conditions where applied, for example in high-salinity waters with a resulting higher density, the composition density can be accordingly adjusted to a higher value; application on firmer or higher bulk density soils can enable a denser composition; the composition can be cast in place on the land surface being protected, or can be pre-cast in desired shapes and placed in position; various additives can be incorporated into the composition to provide a desired density and desired surface texture, for example to promote marine life and plant growth where desired; the surface can be contoured to capture sediments, create desired water flow patterns, etc. The equipment used to mix and place the composition may be brought to a soil stabilization area on a barge, or in other applications may be brought to the soil stabilization area by land conveyance.

Therefore, the scope of the invention is to be determined not by the illustrative examples set forth above, but by the appended claims and their legal equivalents.

We claim:

1. A method of stabilizing an area of soil, at least a part of said area of soil underlying a body of water, said soil and the area proximal thereto defining a soil stabilization area, said soil stabilization area comprising organic feedstock therein, comprising the steps of:

providing a barge positioned in said body of water proximal said area of soil to be stabilized, said barge comprising a mixer and a pump thereon;

providing a means for creating particulate organic material from organic feedstock;

transferring organic feedstock gathered from said soil stabilization area to said means for creating particulate organic material, and producing a volume of particulate organic material therefrom;

with said mixer, mixing cement, sand, water from said body of water, and a quantity of said particulate organic material in proportions suitable for producing a lightweight concrete composition having a density greater than the density of said water in said body of water, and less than the density of said soil;

with said pump, pumping said lightweight concrete composition onto said soil to form a layer of lightweight concrete composition thereon;

allowing said lightweight concrete composition to cure, thereby forming a layer on said soil resistant to deterioration thereof by water action.

2. The method of claim 1, wherein at least a portion of said lightweight concrete composition is disposed on said soil beneath said body of water.

3. The method of claim 2, wherein at least a portion of said lightweight concrete composition is disposed on said soil surface outside of said body of water.

* * * * *